United States Patent [19]

Franz

[11] 4,263,371
[45] Apr. 21, 1981

[54] ORGANOTIN TREATMENT FOR REDUCING THE REACTIVITY OF A GLASS SURFACE

[75] Inventor: Helmut Franz, Pittsburgh, Pa.

[73] Assignee: PPG Industries, Inc., Pittsburgh, Pa.

[21] Appl. No.: 83,084

[22] Filed: Oct. 9, 1979

Related U.S. Application Data

[63] Continuation of Ser. No. 954,398, Oct. 25, 1978, abandoned.

[51] Int. Cl.³ ............................................. B32B 15/00
[52] U.S. Cl. .................................. 428/432; 427/133; 427/384
[58] Field of Search ............... 427/133, 108, 109, 110, 427/165, 168, 169, 443.2, 384; 428/432

[56] References Cited

U.S. PATENT DOCUMENTS

| | | | |
|---|---|---|---|
| 2,566,346 | 9/1951 | Lytle et al. | 428/432 X |
| 2,567,331 | 9/1951 | Gaiser et al. | 427/110 |
| 3,005,731 | 10/1961 | Payne | 427/108 |
| 3,107,177 | 10/1963 | Saunders et al. | 427/110 |
| 3,420,693 | 1/1969 | Scholes . | |
| 3,647,531 | 3/1972 | Matsushita et al. | 427/110 X |
| 3,677,814 | 7/1972 | Gillery | 428/432 X |
| 3,827,871 | 8/1974 | Budd . | |

Primary Examiner—Shrive P. Beck
Attorney, Agent, or Firm—Donna L. Seidel

[57] ABSTRACT

A method for reducing the surface energy of a glass article by chemisorption of an alkyltin compound at a temperature insufficient to thermally decompose the compound is disclosed.

7 Claims, 1 Drawing Figure

Contact angle of a sessile drop

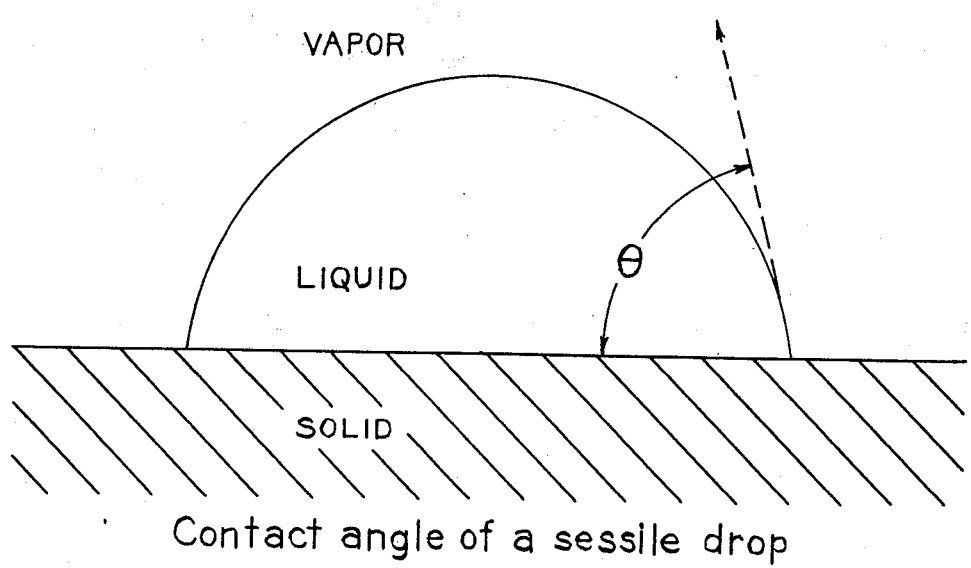
Contact angle of a sessile drop

ORGANOTIN TREATMENT FOR REDUCING THE REACTIVITY OF A GLASS SURFACE

This is a continuation of application Ser. No. 954,398, filed Oct. 25, 1978 and now abandoned.

BACKGROUND OF THE INVENTION

1. Field of the Invention

The present invention relates generally to the art of treating glass surfaces and more particularly to the art of contacting glass surfaces with organotin compounds.

2. The Prior Art

Several methods for treating a glass surface with an organotin compound are known in the art. U.S. Pat. No. 3,827,871 to Budd describes a method for strengthening a glass container by contacting a hot container immediately after forming with a thermally stable metal-organic compound in liquid form. The container is then heated to cause the metal-organic compound to react with the glass to form a diffuse layer of reaction product within the glass surface. Finally, the container is treated at a temperature of at least 450° C. with a liquid or vapor of a metal compound which decomposes rapidly to form a metal oxide film on the glass surface. The metal-organic compound may be the product of the reaction of a tin tetrahalide and a lower alcohol, for example, tin tetrachloride and isopropanol.

Similarly, U.S. Pat. No. 3,420,693 to Scholes et al describes a method for forming a tin oxide coating on a glass surface by exposing a hot glass surface to a thermally decomposable tin compound. The decomposable tin compound may be either inorganic, such as stannic chloride, or organic, such as diethyl isobutyl tin. The decomposable tin compound may be applied in vapor form or may be dissolved or dispersed in water or an organic solvent. The tin oxide coating formed upon thermal decomposition of the tin compound serves as a protective coating on the glass surface.

SUMMARY OF THE INVENTION

The method of the present invention involves treating a glass surface with an organotin compound at a temperature insufficient to cause thermal decomposition of the organotin compound. At such moderate temperatures, according to the method of the present invention, the organotin compound is chemisorbed by the glass surface with the tin-functional moiety bonding to the glass surface and the organic moiety oriented outward from the glass providing a low energy surface layer. This low energy surface layer results in low friction, low chemical reactivity, and repellancy of water, dirt and glass chips. Useful applications of the surface treatment of the present invention include coating molds for the casting of polymer sheets and coating pressing plates for laminating such sheets to glass. The surface treatment provides glass with good releasability with respect to organic polymers such as polyurethanes.

DESCRIPTION OF THE DRAWING

The FIGURE illustrates the contact angle of a sessile drop of liquid on a horizontal solid surface.

DESCRIPTION OF THE PREFERRED EMBODIMENTS

Glass surfaces are passivated by treatment with organotin compounds, preferably alkyltin halides, at temperatures sufficiently low to avoid thermal decomposition of the organotin compounds. The glass surface to be passivated is contacted at a moderate temperature with an organotin compound in either the vapor phase or in a liquid phase as a melt or as a solute in either aqueous or organic solution. Suitable organotin compounds include hexamethylditin and dibutyltin diacetate, as well as alkyltin halides, with methyltin chlorides being preferred.

In a preferred embodiment, an aqueous solution of an alkyltin halide is applied to a glass surface by any conventional technique, preferably dipping or spraying. The concentration of the solution is preferably about 0.1 percent or greater, more preferably from about 1 to 50 percent, most preferably from about 1 to 5 percent. It is preferred to rinse the treated glass surface with water prior to drying to remove excess alkyltin halide from the surface leaving only a molecular layer of chemisorbed organotin rather than a film. In another preferred embodiment, an alkyltin halide having a low melting point is melted upon a glass surface at a temperature sufficiently low that the alkyltin halide does not decompose. Chemisorption of the alkyltin halide occurs and the excess alkyltin halide may be removed by washing. The treated surface is highly water repellant and lubricated.

The layer of chemisorbed organotin is too thin to be measured by conventional techniques. Instead, chemisorption of the organotin is evidenced by the contact angle of water on the treated surface. The contact angles recited herein are measured by the sessile drop method using a modified captive bubble indicator manufactured by Lord Manufacturing, Inc., equipped with Gartner Scientific goneometer optics. The surface to be measured is placed in a horizontal position, facing upward, in front of a point light source such as a slide projector lamp. A drop of water is placed on top of the surface in front of the light source so that the contours of the sessile drop can be viewed and the contact angle, as shown in the drawing, measured through a goneometer telescope equipped with circular protractor graduation.

The contact angle for a sessile drop of water on an untreated glass surface is typically about 10°. Surfaces treated according to the present invention having desirable surface properties typically have contact angles greater than 30°, preferably greater than 40° and most preferably between 50° and 90°.

The present invention will be further understood from the descriptions of specific examples which follow.

EXAMPLE I

Crystals of a methyltin chloride compound are melted on the surface of a glass substrate at a temperature of about 150° C. The compound comprises 80 percent dimethyltin dichloride and 20 percent methyltin trichloride and melts between about 60° and 110° C. The compound does not decompose at the above application temperature, but is chemisorbed by the glass surface. The surface is washed to remove the excess (not chemisorbed) methyltin chloride. The treated surface is lubricated and hydrophobic as indicated by a contact angle of 68° for a sessile drop of water on the dry treated surface.

EXAMPLE II

The methyltin chloride of Example I is dissolved in water at a concentration of 50 percent by weight. Clean glass microscope slides are dipped into said solution. The slides are wiped dry, some after a demineralized water rinse. The treated surfaces are all hydrophobic as evidenced by an average contact angle of 67°.

EXAMPLE III

A methyltin chloride solution is prepared as in Example II except that the concentration is 5 percent by weight. Glass slides are treated as in Example II with the same results: all are hydrophobic, equivalent to the samples of Example II with a contact angle of 65°.

EXAMPLE IV

The methyltin chloride of the previous examples is prepared as a 1 percent aqueous solution and flowed onto a glass surface. After one minute, the surface is rinsed with water and dried. The surface is hydrophobic with a contact angle of 65° compared with a contact angle of 10° for an untreated glass surface.

EXAMPLE V

The methyltin chloride of the previous examples is prepared as a 1 percent solution in isopropanol. A glass surface is contacted with the solution for 1 minute, rinsed with isopropanol and dried. The surface is hydrophobic with a contact angle of 75° compared with a contact angle of 10° for a glass surface only rinsed with isopropanol.

EXAMPLE VI

Diethyltin dichloride is dissolved in water at a concentration of 1 percent. A glass surface contacted with the solution for 1 minute, rinsed with water and dried is rendered hydrophobic and has a contact angle of 55°.

EXAMPLE VII

Glass surfaces treated with 1 percent solutions of dibutyltin dichloride in either water or isopropanol are hydrophobic with contact angles of 70° in both cases.

EXAMPLE VIII

A 1 percent solution of diethyltin dichloride in isopropanol is applied as in Example V. The treated glass surface is hydrophobic and has a contact angle of 59°.

EXAMPLE IX

A glass surface treated with a 1 percent isopropanol solution of dimethyltin dibromide has a contact angle of 50°.

EXAMPLE X

A glass surface treated with a 1 percent aqueous solution of dimethyltin difluoride has a contact angle of 45°.

EXAMPLE XI

Glass surfaces treated with 1 percent solution of dimethyltin dichloride in either water or isopropanol are hydrophobic with contact angles of 58° and 62° respectively.

EXAMPLE XII

Hexamethylditin is dissolved in water at a concentration of 1 percent. A glass surface is contacted with the solution for 1 minute, rinsed with water and dried. The treated glass surface has a contact angle of 90°.

EXAMPLE XIII

A solution of 1 percent trimethyltin chloride in isopropanol is applied as in previous examples. The treated glass surface has a contact angle of 62°.

EXAMPLE XIV

Glass surfaces are treated with 1 percent solution of methyltin trichloride in either water or isopropanol as in previous examples. The treated surfaces are hydrophobic with contact angles of 60° and 52°, respectively.

EXAMPLE XV

Glass surfaces are treated with 1 percent solutions of dibutyltin diacetate in either water or isopropanol. The surfaces are rinsed with the appropriate solvent and dried. In both instances, the treated surfaces are hydrophobic with contact angles of 90°.

The above examples are offered to illustrate the present invention. Other organotin compounds and other organic solvents may be used so long as the organotin compound is soluble in the solvent and is chemisorbed by the glass surface from the solution. A wide variety of concentration, time and temperature conditions may be employed. The scope of the invention is defined by the following claims.

I claim:

1. A method for treating a glass surface which comprises contacting the surface with a composition consisting of an alkyltin compound capable of chemisorption by the glass surface at a temperature insufficient to cause thermal decomposition of the alkyltin compound for a time sufficient to allow chemisorption of the alkyltin compound by the glass surface.

2. The method according to claim 1, wherein the alkyltin compound is an alkyltin halide.

3. The method according to claim 2, wherein the alkyltin halide is selected from the group consisting of methyltin trichloride, dimethyltin dichloride, trimethyltin chloride and mixtures thereof.

4. The method according to claim 1, wherein the glass surface is contacted with a solution of the alkyltin.

5. A glass article prepared by contacting a glass surface with a composition consisting of an alkyltin compound capable of chemisorption by the glass surface at a temperature insufficient to cause thermal decomposition of the alkyltin compound for a time sufficient to allow chemisorption of the alkytin compound by the glass surface.

6. The glass article according to claim 5 wherein the glass surface which has chemisorbed the alkyltin is characterized by having a contact angle with a sessile drop of water greater than 30°.

7. The glass article according to claim 5 wherein the glass surface is contacted with an alkyltin halide.

* * * * *